(12) United States Patent
Kim

(10) Patent No.: US 9,476,538 B2
(45) Date of Patent: Oct. 25, 2016

(54) PIPE INSULATION APPARATUS HAVING FINISHING COVER OF COMPRESSION-BONDED STRUCTURE

(71) Applicant: DONG IN ENGINEERING CO., LTD., Gyeongju (KR)

(72) Inventor: Kook Soo Kim, Gyeongju (KR)

(73) Assignee: DONG IN ENGINEERING CO., LTD., Gyeongju-Si (KR)

( * ) Notice: Subject to any disclaimer, the term of this patent is extended or adjusted under 35 U.S.C. 154(b) by 0 days.

(21) Appl. No.: 15/027,760

(22) PCT Filed: May 27, 2014

(86) PCT No.: PCT/KR2014/004732
§ 371 (c)(1),
(2) Date: Apr. 7, 2016

(87) PCT Pub. No.: WO2015/068920
PCT Pub. Date: May 14, 2015

(65) Prior Publication Data
US 2016/0245452 A1 Aug. 25, 2016

(30) Foreign Application Priority Data
Nov. 11, 2013 (KR) ........................ 10-2013-0136269

(51) Int. Cl.
*F16L 9/14* (2006.01)
*F16L 59/16* (2006.01)
*F16L 59/02* (2006.01)
*F16L 59/10* (2006.01)
(Continued)

(52) U.S. Cl.
CPC ............ *F16L 59/163* (2013.01); *F16L 59/024* (2013.01); *F16L 59/103* (2013.01); *F16L 59/11* (2013.01); *F16L 59/161* (2013.01); *F16L 59/184* (2013.01); *F16L 59/22* (2013.01)

(58) Field of Classification Search
USPC ....... 138/149, 151, 155, 158, 162, 163, 167, 138/169
See application file for complete search history.

(56) References Cited

U.S. PATENT DOCUMENTS 155,493 A * 9/1874 Chapman ................ F16L 9/003
138/158
822,004 A * 5/1906 Kronauer ................ F16L 9/003
138/158
(Continued)

FOREIGN PATENT DOCUMENTS

JP 07-038894 7/1995
JP 11-118090 4/1999
(Continued)

*Primary Examiner* — James Hook
(74) *Attorney, Agent, or Firm* — Lex IP Meister, PLLC

(57) ABSTRACT

In a pipe insulation apparatus includes a plurality of segments which are connected so as to be separable along division lines, and each of the plurality of segments is composed of a plurality of insulation layers, and is covered by a finishing cover. The finishing cover includes: at least one joint chassis that is made of a soft metal material, and has a first insertion groove and a second insertion groove formed at a first end portion and a second end portion, respectively, and has a saw-toothed first protrusion formed on one inner side surface of each of the first insertion groove and the second insertion groove and a saw-toothed second protrusion formed alternately with the first protrusion on the other inner side surface; and a plurality of plates that is made of a soft metal material.

5 Claims, 11 Drawing Sheets

(51) Int. Cl.
*F16L 59/11* (2006.01)
*F16L 59/18* (2006.01)
*F16L 59/22* (2006.01)

(56) References Cited

U.S. PATENT DOCUMENTS

| | | | | |
|---|---|---|---|---|
| 1,185,014 | A * | 5/1916 | Shea | E04D 1/22 138/156 |
| 3,058,494 | A * | 10/1962 | Mohr | E21D 5/10 138/158 |
| 3,818,669 | A * | 6/1974 | Moss | E04B 1/3211 52/584.1 |
| 4,084,066 | A * | 4/1978 | Gillemot | H02G 15/18 138/156 |
| 4,379,473 | A * | 4/1983 | Kunze | B29C 61/10 138/103 |
| 4,777,072 | A * | 10/1988 | Cason, Jr. | B29C 61/10 138/128 |
| 5,219,403 | A * | 6/1993 | Murphy | F16L 9/003 137/561 A |
| 6,390,139 | B1 * | 5/2002 | Kang | F16L 9/22 138/120 |
| 6,403,180 | B1 * | 6/2002 | Barrall | B32B 1/08 138/141 |
| 7,360,799 | B1 * | 4/2008 | Price | F16L 59/22 138/149 |
| 2005/0095446 | A1 * | 5/2005 | Cless | B32B 1/08 428/608 |

FOREIGN PATENT DOCUMENTS

| | | |
|---|---|---|
| JP | 2008-138772 | 6/2008 |
| KR | 10-1184392 | 9/2012 |

\* cited by examiner

Fig. 7
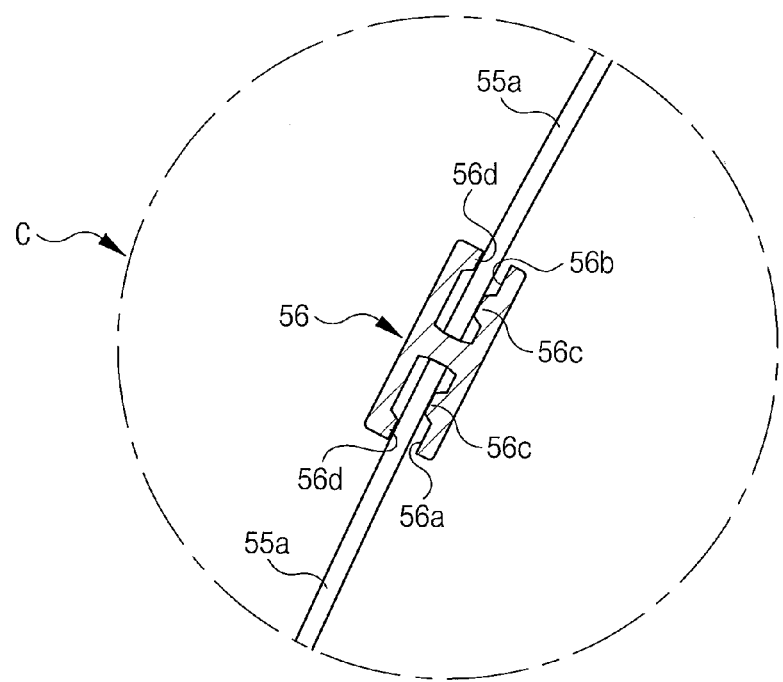
(a)
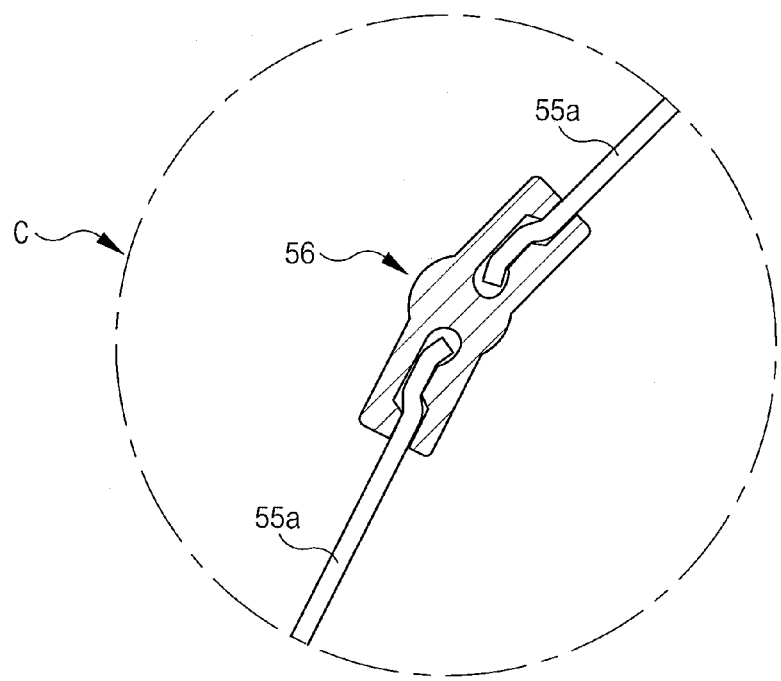
(b)

Fig. 8
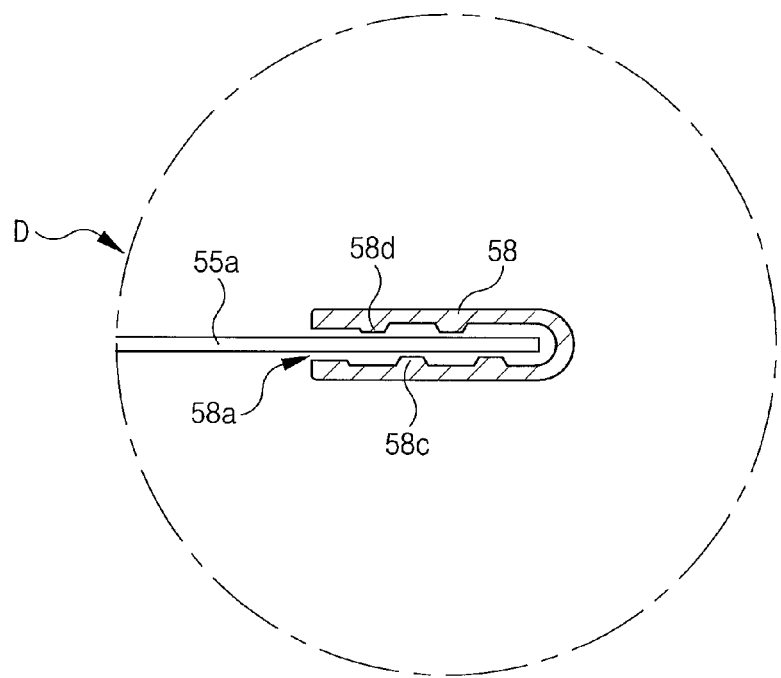
(a)
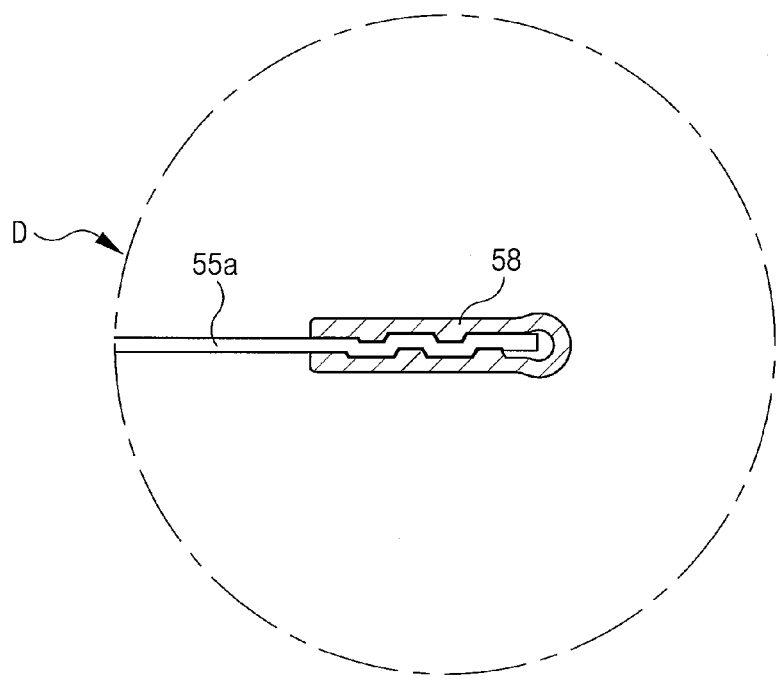
(b)

75

PIPE INSULATION APPARATUS HAVING FINISHING COVER OF COMPRESSION-BONDED STRUCTURE

TECHNICAL FIELD

The present invention relates to a pipe insulation apparatus having finishing covers of compression-bonded structure, and more specifically, to a pipe insulation apparatus which includes finishing covers of compression-bonded structure, and is capable of process simplification during manufacturing of finishing covers for a pipe insulation apparatus, and can improve rigidity and accuracy.

BACKGROUND ART

In general, in power plants (such as nuclear power plants and thermal-electric power plants), petrochemical plants, and the like, pipes for transferring high-temperature and high-pressure steam are installed. With time, these pipes are corroded due to high-temperature and high-pressure steam, whereby the walls of the pipes are thinned.

Such thinning of the walls of pipes may cause pinholes in the pipes with time, resulting in nasty accidents. For this reason, once a year, planned maintenance is performed, whereby wall thinning inspection is performed on pipes and the results of the inspection are recorded and reported.

In a case of performing such wall thinning inspection, if existing insulators have been applied on pipes, finishing metal covers and the insulators of the outer side of the pipes are subsequently removed, and then wall thinning inspection is performed. After the wall thinning inspection is performed, new insulators are attached, and then finishing with the finishing covers is performed.

This manner in which insulators are applied after wall thinning inspection causes a huge amount of waste such as insulators and finishing covers, which results in a waste of an enormous amount of materials. Especially, in a case of applying insulators on elbow or T-joint portions, a higher degree of skill is required as compared to a case of applying insulators on straight pipes, and if the insulators are erroneously applied, thermal notches may be formed, whereby thermal stress may increase and thinning of the walls of the corresponding portions may remarkably proceed, whereby the life of the whole piping apparatus may decrease.

A method for solving that problem has been proposed in Korea Patent No. 10-1184392 (registered on Sep. 13, 2012). In Korea Patent No. 10-1184392 (registered on Sep. 13, 2012), a pipe insulation apparatus includes elbow insulation units, T-joint insulation units, straight-pipe insulation units, and flange insulation units, and each of the insulation units includes two or more segments, and each of the segments is composed of a plurality of insulation layers and is covered with a finishing metal cover.

The finishing cover according to the related art has a structure in which a plurality of assembly segments 55a (or plates) is assembled so as to correspond to the curved surface of an elbow 21 as shown in FIG. 10 of Korea Patent No. 10-1184392 (registered on Sep. 13, 2012). The plurality of assembly segments 55a has bent assembly end portions 55b. Reinforcing connectors 56 have connection end portions 56b bent in the opposition directions to the bending directions of the assembly end portions 55b. The reinforcing connectors 56 are fit on the assembly end portions 55b of the assembly segments 55a and then are compressed in a rolling process or the like, whereby the plurality of assembly segments 55a is connected in a circumferential direction.

However, a process of manufacturing the finishing covers having the above described structure requires a process of bending and connecting the end portions of the assembly segments and the end portions of the reinforcing connectors, and thus is complicated and has a low degree of accuracy, and the reinforcing connectors and the assembly end portions are frequently separated, resulting in defects.

DISCLOSURE OF INVENTION

Technical Problem

An object of the present invention is to provide a pipe insulation apparatus having finishing covers of compression-bonded structure capable of solving the above described problems of the related art.

Another object of the present invention is to provide a pipe insulation apparatus which includes finishing covers of compression-bonded, and is capable of process simplification, and can improve a degree of connection accuracy.

Another object of the present invention is to provide a pipe insulation apparatus which includes finishing covers of compression-bonded structure, and can improve the rigidity of the finishing covers and can enhance the connection strengths of connection portions.

Technical Solution

According to an embodiment of the present invention for achieving a part of the above described technical objects, a pipe insulation apparatus includes elbow insulation units that are applied on the outer surfaces of elbows of pipes, T-joint insulation units that are applied on the outer surfaces of T-joints of the pipes, straight-pipe insulation units that are applied on the outer surfaces of straight pipes of the pipes, and flange insulation units that are applied on the outer surfaces of flange portions of the pipe. In the pipe insulation apparatus, each of the elbow insulation units, the T-joint insulation units, the straight-pipe insulation units, and the flange insulation units includes a plurality of segments which is connected so as to be separable along division lines, and each of the plurality of segments is composed of a plurality of insulation layers, and is covered by a finishing cover. The finishing cover includes: at least one joint chassis that is made of a soft metal material, and has a first insertion groove and a second insertion groove formed at a first end portion and a second end portion, respectively, and has a saw-toothed first protrusion formed on one inner side surface of each of the first insertion groove and the second insertion groove and a saw-toothed second protrusion formed alternately with the first protrusion on the other inner side surface; and a plurality of plates that is made of a soft metal material. In a manner in which one end portion of a first plate which is any one of the plurality of plates is inserted into the first insertion groove, and one end portion of a second plate to be adjacent to the first plate is inserted into the second insertion groove, and then at least one joint chassis is compressed such that the first plate and the second plate are connected, the plurality of plates and at least one joint chassis are connected so as to correspond to the curved surfaces of the pipes.

The at least one joint chassis may have a cross section of an H shape, or be bent at the middle portion such that the first end portion and the second end portion form a predetermined angle.

Each of the at least one joint chassis and the plurality of plates may be made of an aluminum material.

The finishing cover may further include at least one finishing chassis, which contains a soft metal material, and has a third insertion groove formed in one end portion and has a U shape, and has saw-toothed first protrusions formed at regular intervals on one inner side surface of the third insertion groove and saw-toothed second protrusions formed alternately with the first protrusions on the other side surface. In a state where only one end portion of a plate which is one of the plurality of plates and constitutes an end portion of the finishing cover is connected to the at least one joint chassis, and the other end portion is inserted into the third insertion groove, the at least one finishing chassis may be compressed such that the plate and the at least one finishing chassis are connected.

Each of the plurality of segments may include an inner insulation layer, an outer insulating layer which is disposed on the outer side in the radial direction of the inner insulation layer, and an intermediate insulation layer which is interposed between the inner insulation layer and the outer insulation layer.

Advantageous Effects

According to the present invention, attachment and detachment are easy, and it is possible to improve a degree of connection accuracy, and it is possible to achieve process simplification. Also, it is possible to improve the rigidity of finishing covers and enhance the connection strengths of the connection portions. As a result, it is possible to improve the rigidity of the pipe insulation apparatus.

BRIEF DESCRIPTION OF DRAWINGS

FIG. 7 is an enlarged view illustrating states of a portion "C" of FIG. 6 before and after compressing.

FIG. 8 is an enlarged view illustrating states of a portion "D" of FIG. 6 before and after compressing.

BEST MODE FOR CARRYING OUT THE INVENTION

Hereinafter, embodiments of the present invention will be described in detail with reference to the accompanying drawings only for the purpose of providing a thorough understanding of the present invention to those skilled in the art.

Figure 1:
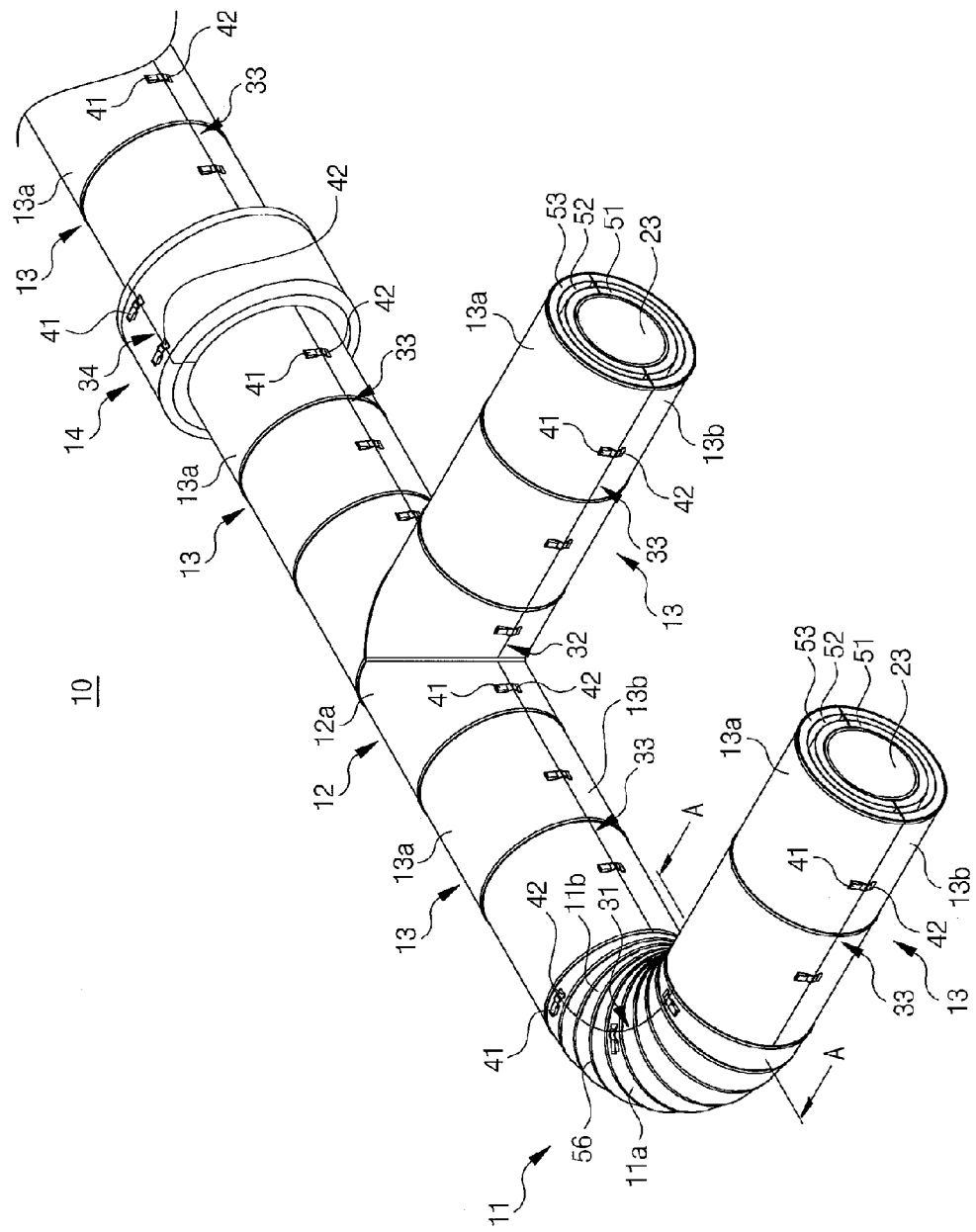
FIG. 1 is a perspective view illustrating an assembled state of a pipe insulation apparatus according to an embodiment of the present invention.
Figure 2:
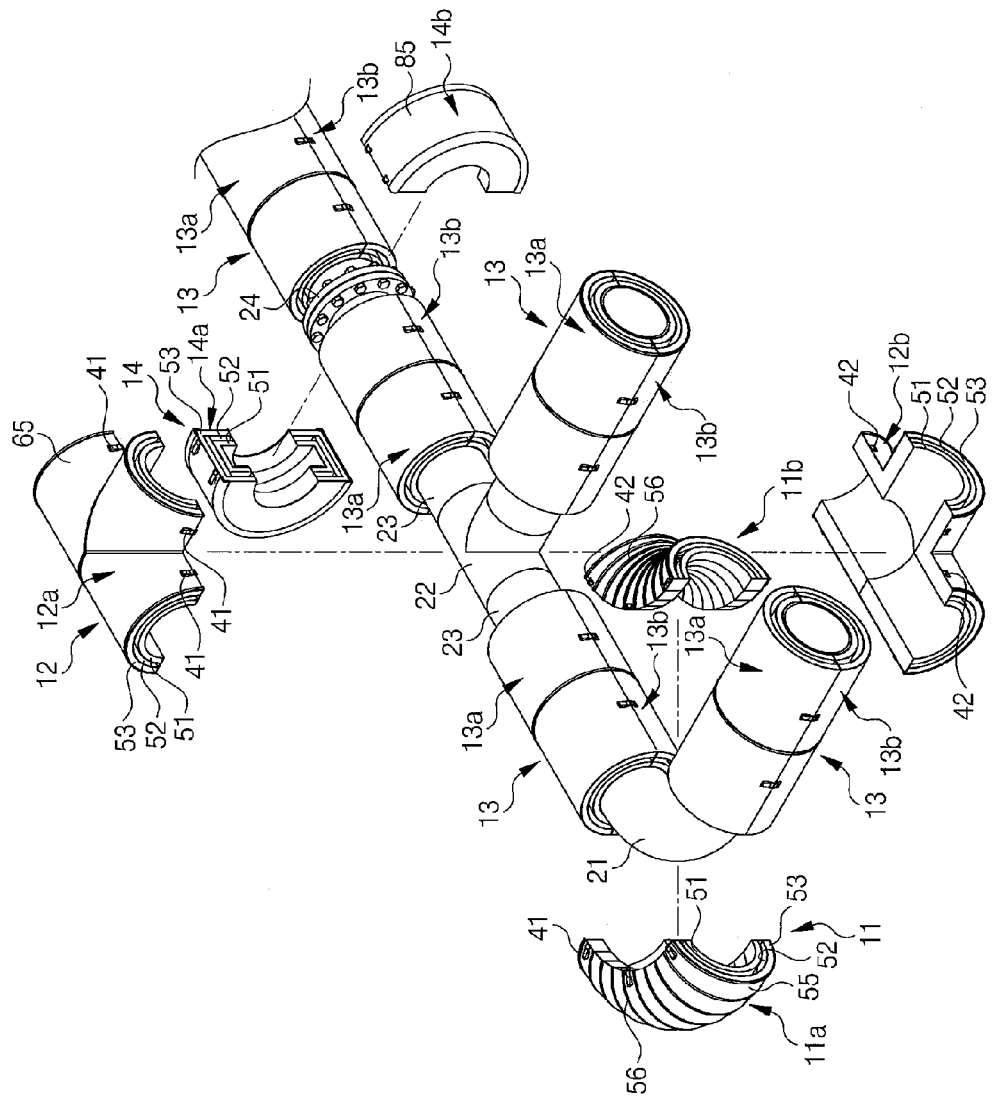
FIG. 2 is a view illustrating a state where an elbow insulation unit, a T-joint insulation unit, and a flange insulation unit of FIG. 1 have been disassembled.
Figure 3:
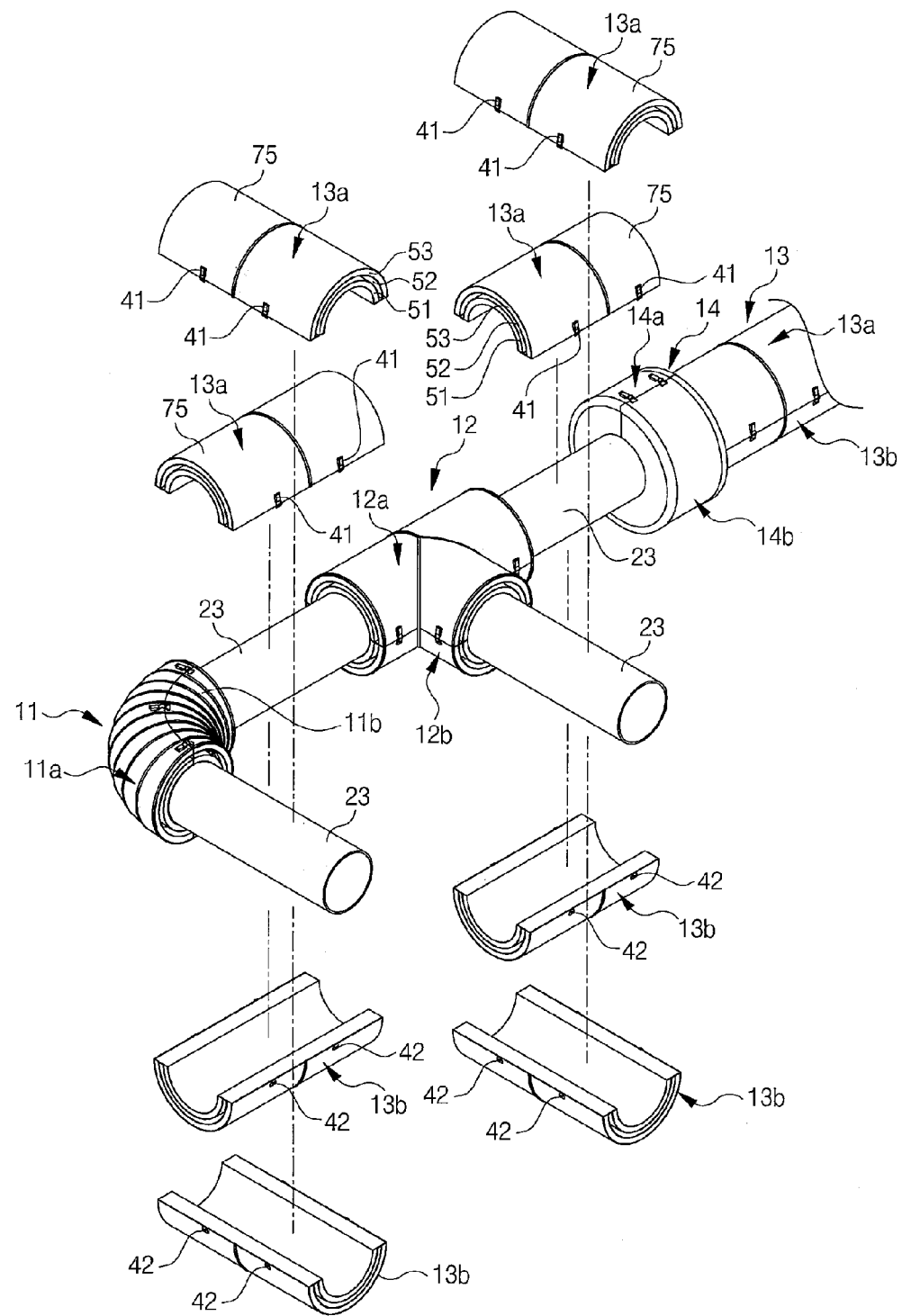
FIG. 3 is a view illustrating a state where straight-pipe insulation units of FIG. 1 have been disassembled.
Figure 4:
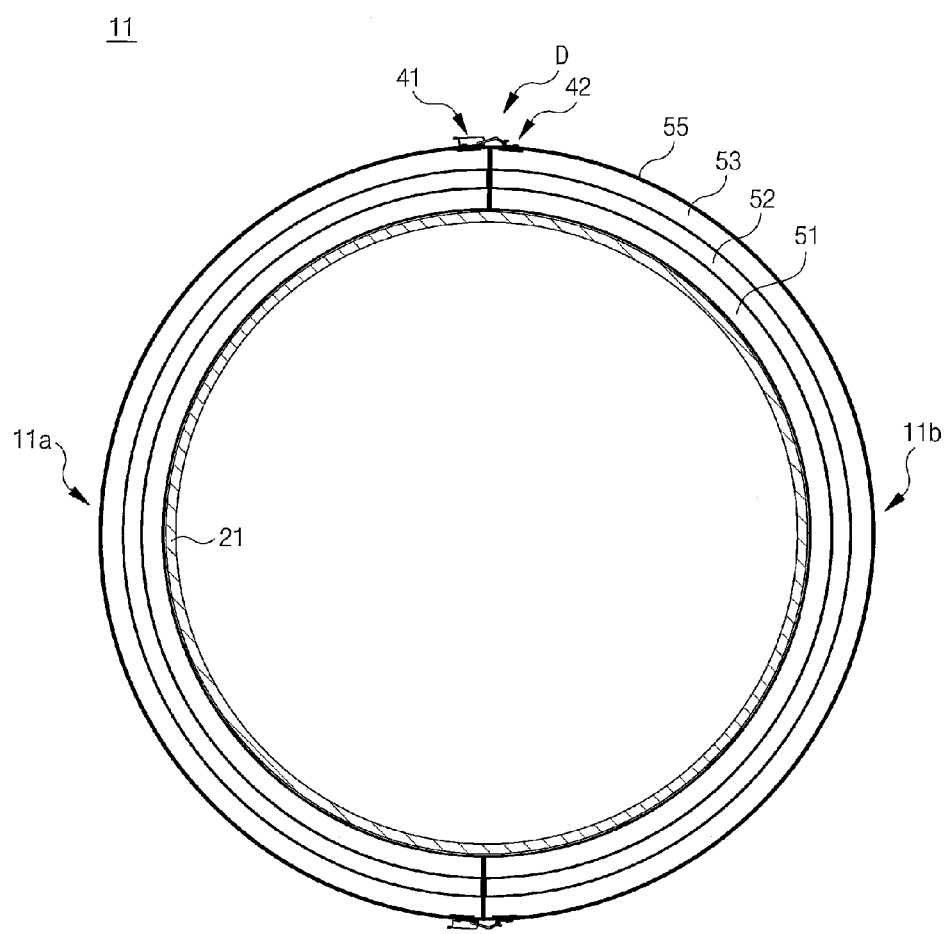
FIG. 4 is a cross-sectional view along a line A-A of FIG. 1.

FIGS. 1 to 4 are views illustrating a pipe insulation apparatus according to an embodiment of the present invention. FIG. 1 is a perspective view illustrating an assembled state of the pipe insulation apparatus according to the embodiment of the present invention, and FIG. 2 is a view illustrating a state where an elbow insulation unit, a T-joint insulation unit, and a flange insulation unit of FIG. 1 have been disassembled, and FIG. 3 is a view illustrating a state where straight-pipe insulation units of FIG. 1 have been disassembled, and FIG. 4 is a cross-sectional view along a line A-A of FIG. 1.

As shown in FIGS. 1 to 4, a pipe insulation apparatus 10 according to an embodiment of the present invention is easily attached to and detached from the outer surface of piping (21, 22, and 23), and the piping (21, 22, and 23) is extended in predetermined directions by connecting elbows 21, T-joints 22, straight pipes 23, and the like. At the end portions of the elbows 21, the T-joints 22, the straight pipes 23, and the like of the piping (21, 22, and 23), flange portions 24 are provided. These flange portions 24 are joined by fasteners, whereby the elbows 21, the T-joints 22, the straight pipes 23, and the like are connected.

The pipe insulation apparatus 10 according to the embodiment of the present invention is composed of elbow insulation units 11 which are applied on the outer surfaces of the elbows 21, T-joint insulation units 12 which are applied on the outer surfaces of the T-joints 22, straight-pipe insulation units 13 which are applied on the outer surfaces of the straight pipes 23, and flange insulation units 14 which are applied on the outer surfaces of the flange portions 24 for connecting the pipes 21, 22, and 23.

(Elbow Insulation Units)

An elbow insulation unit 11 includes a plurality of segments 11a and 11b having shapes corresponding to an elbow 21 so as to surround the outer surface of the elbow 21. The plurality of segments 11a and 11b is divided along division lines 31, and the segments 11a and 11b are joined on the outer surface of the elbow 21 so as to be separable.

As shown in FIG. 4, each segment 11a or 11b includes an inner insulation layer 51 which is disposed to be in contact with the outer surface of the elbow 21, an outer insulation layer 53 which is disposed on the outer side in the radial direction of the inner insulation layer 51, and an intermediate insulation layer 52 which is interposed between the inner insulation layer 51 and the outer insulation layer 53.

The inner insulation layer 51 and the outer insulation layer 53 may be made of a material such as glass wool or mineral wool, and may also be made of a material such as foamed polyethylene in a case where a fluid to pass through the piping (21, 22, and 23) has a low temperature. The inner insulation layer 51 and the outer insulation layer 53 may be made of the same insulator.

The intermediate insulation layer 52 may be configured to have a jacket structure having a space 52a filled with air or argon gas. Alternatively, the intermediate insulation layer 52 may be made of an insulator for high temperature, such as HITLIN, or the intermediate insulation layer 52 may be made of an insulator different from those of the inner insulation layer 51 and the outer insulation layer 53.

Also, the inner insulation layer 51, the outer insulation layer 53, and the intermediate insulation layer 52 may be covered and protected by an insulator protecting layer.

On the outer surfaces of the plurality of segments 11a and 11b, finishing covers 55 are disposed. The finishing covers 55 may be made of a soft metal material so as to be able to stably protect and keep the inner insulation layer 51, the intermediate insulation layer 52, the outer insulation layer 53, and the like.

At end portions of the segments 11a and 11b to come into contact with each other, a first connection portion 41 and a second connection portion 42 are provided so as to correspond to each other. The plurality of segments 11a and 11b is firmly and accurately connected by first connection portions 41 and second connection portions 42.

FIGS. 5 to 8 are views for explaining the structures and connection (assembly) method of elbow finishing covers 55.

Figure 5:
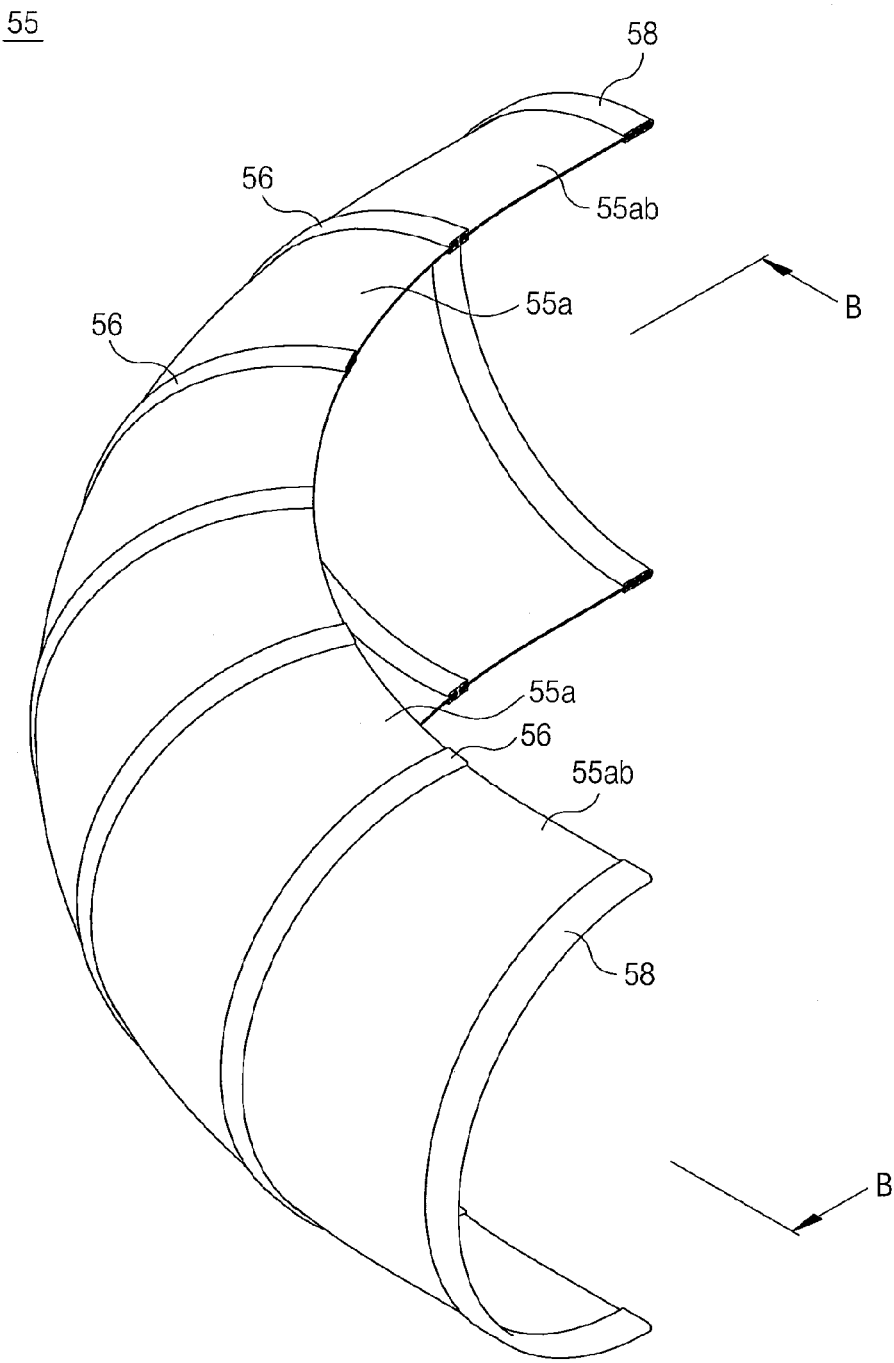
FIG. 5 is a schematic diagram of a finishing cover of an elbow insulation unit.
Figure 6:
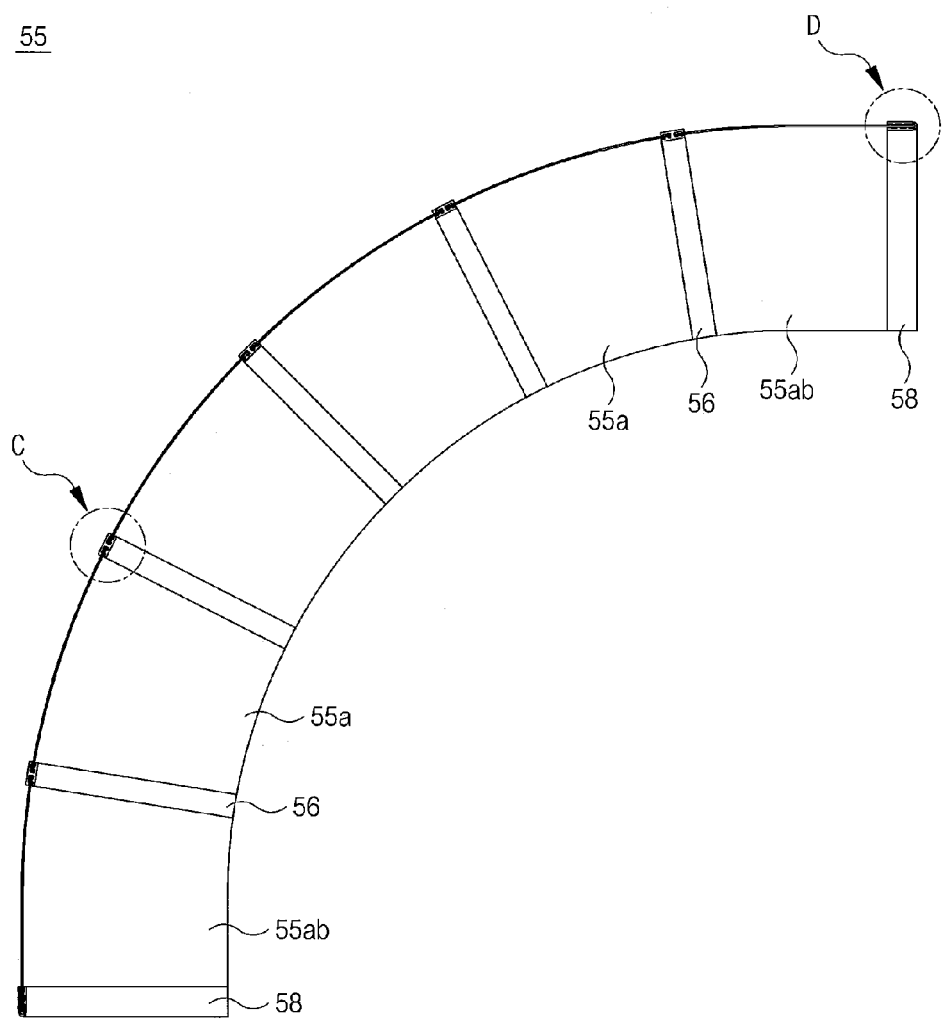
FIG. 6 is a perspective view illustrating a cross section along a line B-B of FIG. 5.

FIG. 5 is a schematic diagram of a finishing cover 55, and FIG. 6 is a perspective view illustrating a cross section along a line B-B of FIG. 5, and FIG. 7 is an enlarged view illustrating states of a portion "C" of FIG. 6 before and after compressing, and FIG. 8 is an enlarged view illustrating states of a portion "D" of FIG. 6 before and after compressing.

As shown in FIGS. 5 to 8, a plurality of plates 55a and at least one joint chassis 56 are assembled so as to correspond to the curved surface of the elbow 21, whereby the finishing cover 55 is assembled and is used as an external cover for the segment 11a or 11b constituting the elbow insulation unit 11.

The finishing cover 55 has a structure in which at least one joint chassis 56 and the plurality of plates 55a are assembled or connected. Additionally, the end portions of the finishing cover 55 may be connected with at least one finishing chassis 58.

The at least one joint chassis 56, the plurality of plates 55a, and the at least one finishing chassis 58 constituting the finishing cover 55 may contain a soft metal material (for example, an aluminum material).

The at least one joint chassis 56 has a length corresponding to the length of the segment 11a or 11b, and may have a predetermined width.

At a first assembly end portion of the at least one joint chassis 56, a first insertion groove 56a is formed long in the longitudinal direction, and at a second assembly end portion on the opposite side, a second insertion groove 56b is formed along the longitudinal direction. On one internal side surface of each of the first insertion groove 56a and the second insertion groove 56b, a saw-toothed first protrusion 56c is formed, and on the other internal side surface, a saw-toothed second protrusion 56d is formed alternately with the first protrusion 56c. A plurality of first protrusions 56c and a plurality of second protrusions 56d may be formed.

The first protrusion 56c and the second protrusion 56d are formed so as not to face each other. That is, at a portion of the other inner side portion facing a portion where the first protrusion 56c is formed, the second protrusion 56d is not formed, and at a portion close to the portion of the other inner side portion facing the portion where the first protrusion is formed, the second protrusion 56d is formed so as to be able to be engaged with the first protrusion during compression.

Therefore, as shown in Part (a) of FIG. 7, the at least one joint chassis 56 may have a cross section of an H shape, and may have a flat plate shape or a curved shape corresponding to the curved surface of the elbow 21.

The plurality of plates 55a has a length corresponding to the length of the segment 11a or 11b, and may have a flat plate shape or a curved shape corresponding to the curved surface of the elbow 21, and may have various widths so as to be able to surround the curved surface of the elbow 21.

The plurality of plates 55a and the at least one joint chassis 56 are assembled as follow.

As shown in Part (a) of FIG. 7, one end portion of a first plate 55a which is any one of the plurality of plates 55a is inserted into the first protrusion 56c, and one end portion of a second plate 55a to be adjacent to the first plate 55a is inserted into the second protrusion 56d. Thereafter, when the at least one joint chassis 56 is compressed, since the at least one joint chassis 56 and the plates 55a are soft metal materials, the first protrusion 56c and the second protrusion 56d are compressed together with the plates 55a such that they are engaged with each other with the end portions of the plates 55a interposed therebetween as shown in Part (b) of FIG. 7. Therefore, two neighboring plates 55a are accurately and firmly connected with the at least one joint chassis 56 interposed therebetween.

The plurality of plates 55a and the at least one joint chassis 56 can be connected into a curved shape in the above described manner so as to correspond to the curved surface of the elbow 21, whereby the finishing cover 55 can be configured.

Additionally, in order to improve the rigidity of the end portions of the finishing cover 55, the at least one finishing chassis 58 may be connected to the finishing cover 55.

The at least one finishing chassis 58 has a length corresponding to the length of the segment 11a or 11b, and may have a predetermined width.

As shown in Part (a) of FIG. 8, the at least one finishing chassis 58 has a third insertion groove 58a formed at an assembly end portion, and thus has a cross section of a U shape. On one inner side surface of the third insertion groove 58a, a saw-toothed first protrusion 58c is formed, and on the other internal side surface, a saw-toothed second protrusion 58d is formed alternately with the first protrusion 58c.

A plurality of first protrusions 58c and a plurality of second protrusions 58d may be formed.

The first protrusion 58c and the second protrusion 58d are formed so as not to face each other. That is, at a portion of the other inner side portion facing a portion where the first protrusion 58c is formed, the second protrusion 56d is not formed, and at a portion close to the portion of the other inner side portion facing the portion where the first protrusion is formed, the second protrusion 58d is formed so as to be able to be engaged with the first protrusion during compression.

The at least one finishing chassis 58 may be connected to the other end portion of an end plate 55ab which is one plate of the plurality of plates 55a and constitutes an end portion of the finishing cover 55.

That is, in a case where only one end portion of the end plate 55ab is connected to the at least one joint chassis 56, the other end portion is inserted into the third insertion groove 58a as shown in Part (a) of FIG. 8. Thereafter, when the at least one finishing chassis 58 is compressed, since the at least one finishing chassis 58 and the end plate 55ab are soft metal materials, the first protrusion 58c and the second protrusion 58d are compressed together with the end plate 55ab such that they are engaged with each other with the other end portion of the end plate 55a interposed therebetween as shown in Part (b) of FIG. 8. Therefore, the at least one finishing chassis 58 is accurately and firmly connected to the end portion of the end plate 55ab interposed therebetween.

The at least one finishing chassis 58 may be connected for improving rigidity or if necessary.

(T-Joint Insulation Units)

A T-joint insulation unit 12 includes a plurality of segments 12a and 12b having shapes corresponding to a T-joint 22 so as to surround the outer surface of the T-joint 22. The plurality of segments 12a and 12b is divided along division lines 32, and the segments 12a and 12b are joined on the outer surface of the T-joint 22 so as to be separable.

Each segment 12a or 12b of the T-joint insulation unit 12 includes an inner insulation layer 51 which is disposed to be in contact with the outer surface of the T-joint 22, an outer insulation layer 53 which is disposed on the outer side in the radial direction of the inner insulation layer 51, and an intermediate insulation layer 52 which is interposed between the inner insulation layer 51 and the outer insulation layer 53.

The structures of the insulation layers 51, 52, and 53 are the same as those of the elbow insulation unit 11.

On the outer surface of the T-joint insulation unit 12 or each segment 12a or 12b, a finishing cover 65 is disposed. The finishing cover 65 may be made of a soft metal material so as to be able to stably protect and keep the inner insulation layer 51, the intermediate insulation layer 52, the outer insulation layer 53, and the like.

At end portions of the segments 12a and 12b to come into contact with each other, a first connection portion 41 and a second connection portion 42 are provided so as to correspond to each other. The plurality of segments 12a and 12b is firmly and accurately connected by the first connection portion 41 and the second connection portion 42.

Figure 9:
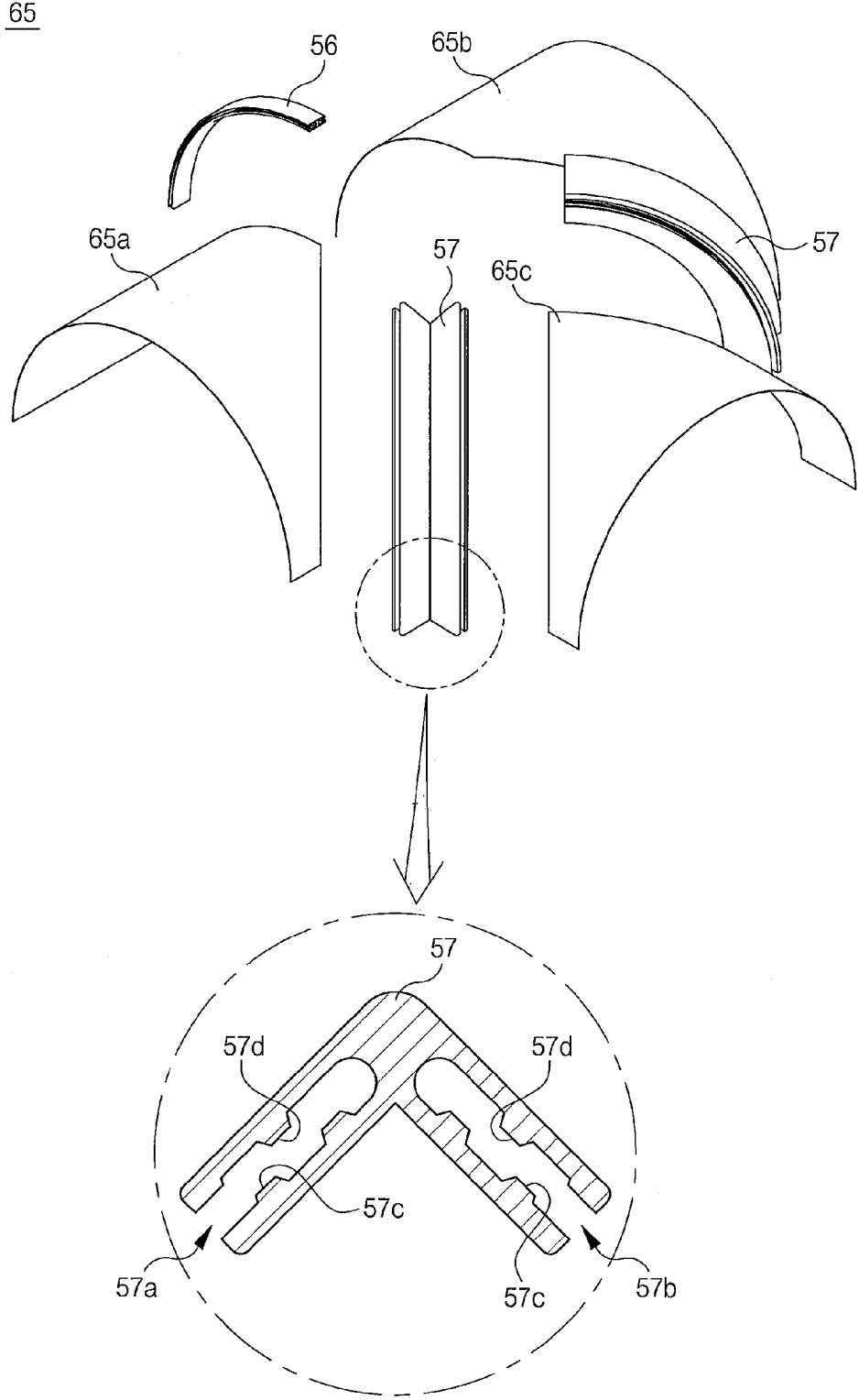
FIG. 9 is a view for explaining the structure and connection (assembly) method of a T-joint finishing cover.

FIG. 9 is a view for explaining the structure and connection (assembly) method of a T-joint finishing cover 65.

As shown in FIG. 9, a plurality of plates 65a and at least one joint chassis (56, 57) are assembled to correspond to the curved surface of the T-joint 22, whereby the finishing cover 65 is assembled, and is used as an external cover for the segment 12a or 12b constituting the T-joint insulation unit 12.

The T-joint finishing cover 65 has a structure in which at least one joint chassis (56, 57) and the plurality of plates 65a, 65b, and 65c are connected. Although not shown, additionally, the end portions of the T-joint finishing cover 65 may be connected with at least one finishing chassis 58 in the same way as that of the elbow finishing cover 55.

The at least one joint chassis (56, 57), the plurality of plates 65a, 65b, and 65c, and the at least one finishing chassis 58 constituting the T-joint finishing cover 65 may contain a soft metal material (for example, an aluminum material).

The at least one joint chassis (56, 57) constituting the T-joint finishing cover 65 can be composed of two types.

A first joint chassis 56 has the same structure as that of at least one joint chassis 56 constituting an elbow finishing cover 55. That is, the first joint chassis has a length corresponding to the length of the segment 12a or 12b, and may have a predetermined width.

At a first assembly end portion of the at least one joint chassis 56, a first insertion groove 56a is formed long in the longitudinal direction, and at a second assembly end portion on the opposite side, a second insertion groove 56b is formed along the longitudinal direction. On one internal side surface of each of the first insertion groove 56a and the second insertion groove 56b, a saw-toothed first protrusion 56c is formed, and on the other internal side surface, a saw-toothed second protrusion 56d is formed alternately with the first protrusion 56c. A plurality of first protrusions 56c and plurality of second protrusions 56d may be formed.

The first protrusion 56c and the second protrusion 56d are formed so as not to face each other. That is, at a portion of the other inner side portion facing a portion where the first protrusion 56c is formed, the second protrusion 56d is not formed, and at a portion close to the portion of the other inner side portion facing the portion where the first protrusion is formed, the second protrusion 56d is formed so as to be able to be engaged with the first protrusion during compression.

Therefore, as shown in Part (a) of FIG. 7, the at least one joint chassis 56 may have a cross section of an H shape, and may have a curved shape corresponding to the curved surface of the elbow 21.

The first joint chassis 56 is for connecting two plates 65a and 65b in parallel.

A second joint chassis 57 may be bent at the middle portion such that the first end portion and the second end portion form a predetermined angle and its cross-sectional shape becomes an L shape. That is, the second joint chassis may be configured by bending the middle portion of the first joint chassis 56 at a right angle or a predetermined angle.

Therefore, at a first assembly end portion of the joint chassis 57, a first insertion groove 57a is formed long in the longitudinal direction, and at a second assembly end portion on the opposite side, a second insertion groove 57b is formed along the longitudinal direction. On one internal side surface of each of the first insertion groove 57a and the second insertion groove 57b, a saw-toothed first protrusion 57c is formed, and on the other internal side surface, a saw-toothed second protrusion 57d is formed alternately with the first protrusion 57c. A plurality of first protrusions 57c and a plurality of second protrusions 57d may be formed.

The first protrusion 57c and the second protrusion 57d are formed so as not to face each other. That is, at a portion of the other inner side portion facing a portion where the first protrusion 57c is formed, the second protrusion 57d is not formed, and at a portion close to the portion of the other inner side portion facing the portion where the first protrusion is formed, the second protrusion 57d is formed so as to be able to be engaged with the first protrusion during compression.

Therefore, as shown in the cross-sectional view of the lower part of FIG. 9, the at least one joint chassis 57 may have a cross section of an L shape, and may have a curved shape corresponding to the curved surface of the T-joint 22.

The second joint chassis 57 can be used to connect two plates 65a and 65c or 65b and 65c at a right angle or a predetermined angle.

The plurality of plates 65a, 65b, and 65c has lengths corresponding to the lengths of the segments 12a and 12b, and may have a flat plate shape or a curved shape corresponding to the curved surface of the T-joint 22, and may have various widths so as to be able to surround the curved surface of the T-joint 22.

The manner to connect (assemble) the plurality of plates 65a, 65b, and 65c and the at least one joint chassis (56, 57) is the same as the manner described with respect to the elbow finishing cover 55.

(Straight-Pipe Insulation Units)

A straight-pipe insulation unit 13 includes a plurality of segments 13a and 13b having shapes corresponding to a straight pipe 23 so as to surround the outer surface of the straight pipe 23. The plurality of segments 13a and 13b is divided along division lines 33, and the segments 13a and 13b are joined on the outer surface of the straight pipe 23 so as to be separable.

Each segment 13a or 13b of the straight-pipe insulation unit 13 includes an inner insulation layer 51 which is disposed to be in contact with the outer surface of the straight pipe 23, an outer insulation layer 53 which is disposed on the outer side in the radial direction of the inner insulation layer 51, and an intermediate insulation layer 52 which is interposed between the inner insulation layer 51 and the outer insulation layer 53.

The structures of the insulation layers 51, 52, and 53 are the same as those of the elbow insulation unit 11.

On the outer surface of the straight-pipe insulation unit 13 or the segment 13a or 13b, a straight-pipe finishing cover 75 is disposed. The straight-pipe finishing cover 75 may be made of a soft metal material so as to be able to stably protect and keep the inner insulation layer 51, the intermediate insulation layer 52, the outer insulation layer 53, and the like.

At end portions of the segments 13a and 13b to come into contact with each other, a first connection portion 41 and a second connection portion 42 are provided so as to correspond to each other. The plurality of segments 12a and 12b is firmly and accurately connected by first connection portions 41 and second connection portions 42.

Figure 10:
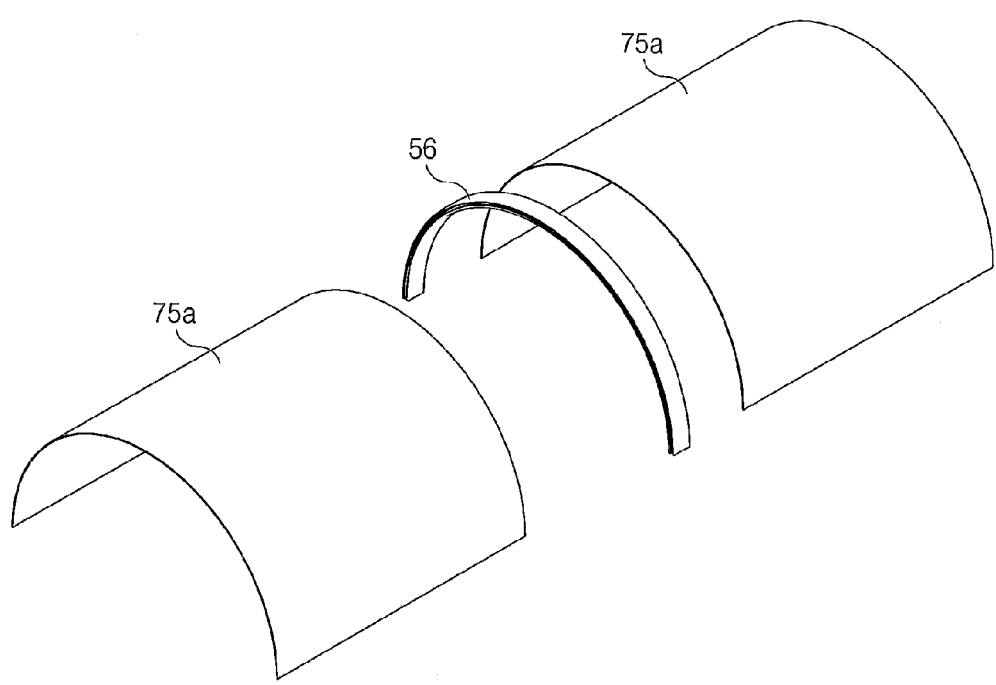
FIG. 10 is a view for explaining the structure and connection (assembly) method of a straight-pipe finishing cover.

FIG. 10 is a view for explaining the structure and connection (assembly) method of the straight-pipe finishing cover 75.

As shown in FIG. 10, a plurality of plates 75a and at least one joint chassis 56 are assembled so as to correspond to the curved surface of the straight pipe 23, whereby the straight-pipe finishing cover 75 is assembled, and is used as an external cover for the segment 13a or 13b constituting the straight-pipe insulation unit 13.

The straight-pipe finishing cover 75 has a structure in which at least one joint chassis 56 and the plurality of plates 75a are connected. Although not shown, additionally, the end portions of the straight-pipe finishing cover 75 may be connected with at least one finishing chassis 58 in the same way as that of the elbow finishing cover 55.

The at least one joint chassis 56, the plurality of plates 75a, and the at least one finishing chassis 58 constituting the straight-pipe finishing cover may contain a soft metal material (for example, an aluminum material).

The at least one joint chassis 56 has the same structure as that of at least one joint chassis 56 constituting an elbow finishing cover 55. That is, the at least one joint chassis has a length corresponding to the length of the segment 13a or 13b, and may have a predetermined width.

At a first assembly end portion of the at least one joint chassis 56, a first insertion groove 56a is formed long in the longitudinal direction, and at a second assembly end portion on the opposite side, a second insertion groove 56b is formed along the longitudinal direction. On one internal side surface of each of the first insertion groove 56a and the second insertion groove 56b, a saw-toothed first protrusion 56c is formed, and on the other internal side surface, a saw-toothed second protrusion 56d is formed alternately with the first protrusion 56c. A plurality of first protrusions 56c and a plurality of second protrusions 56d may be formed.

The first protrusion 56c and the second protrusion 56d are formed so as not to face each other. That is, at a portion of the other inner side portion facing a portion where the first protrusion 56c is formed, the second protrusion 56d is not formed, and at a portion close to the portion of the other inner side portion facing the portion where the first protrusion is formed, the second protrusion 56d is formed so as to be able to be engaged with the first protrusion during compression.

Therefore, as shown in Part (a) of FIG. 7, the at least one joint chassis 56 may have a cross section of an H shape, and may have a curved shape corresponding to the curved surface of the straight pipe 23.

The joint chassis 56 is for connecting two plates 75a in parallel.

The plurality of plates 75a has a length corresponding to the length of the segment 13a or 13b, and may have a flat plate shape or a curved shape corresponding to the curved surface of the straight pipe 23, and may have various widths so as to be able to surround the curved surface of the straight pipe 23.

The manner to connect (assemble) the plurality of plates 75a and the at least one joint chassis 56 is the same as the manner described with respect to the elbow finishing cover 55.

(Flange Insulation Units)

The pipes 21, 22, and 23 are connected through the flange portions 24. For example, a straight pipe 23 and a straight pipe 23, a straight pipe 23 and an elbow 21, a T-joint 22 and a straight pipe 23, or the like can be connected by flange portions 24. On the outer surfaces of such flange portions 24, a flange insulation unit 14 is provided so as to surround the flange portions. The flange insulation unit 14 includes a plurality of segments 14a and 14b having shapes corresponding to the flange portions 24 so as to surround the outer surfaces of the flange portions 24. The plurality of segments 14a and 14b is divided along division lines 34, and the segments 14a and 14b are joined on the outer surfaces of the flange portions 24 so as to be separable.

Each segment 14a or 14b of the flange insulation unit 14 includes an inner insulation layer 51 which is disposed to be in contact with the outer surfaces of the flange portions 24, an outer insulation layer 53 which is disposed on the outer side in the radial direction of the inner insulation layer 51, and an intermediate insulation layer 52 which is interposed between the inner insulation layer 51 and the outer insulation layer 53.

The structures of the insulation layers 51, 52, and 53 are the same as those of the elbow insulation unit 11.

On the outer surface of the flange insulation unit 14 or the segment 14a or 14b, a flange finishing cover 85 is disposed. The flange finishing cover 85 may be made of a soft metal material so as to be able to stably protect and keep the inner insulation layer 51, the intermediate insulation layer 52, the outer insulation layer 53, and the like.

At end portions of the segments 14a and 14b to come into contact with each other, a first connection portion 41 and a second connection portion 42 are provided so as to correspond to each other. The plurality of segments 12a and 12b is firmly and accurately connected by first connection portions 41 and second connection portions 42.

Figure 11:
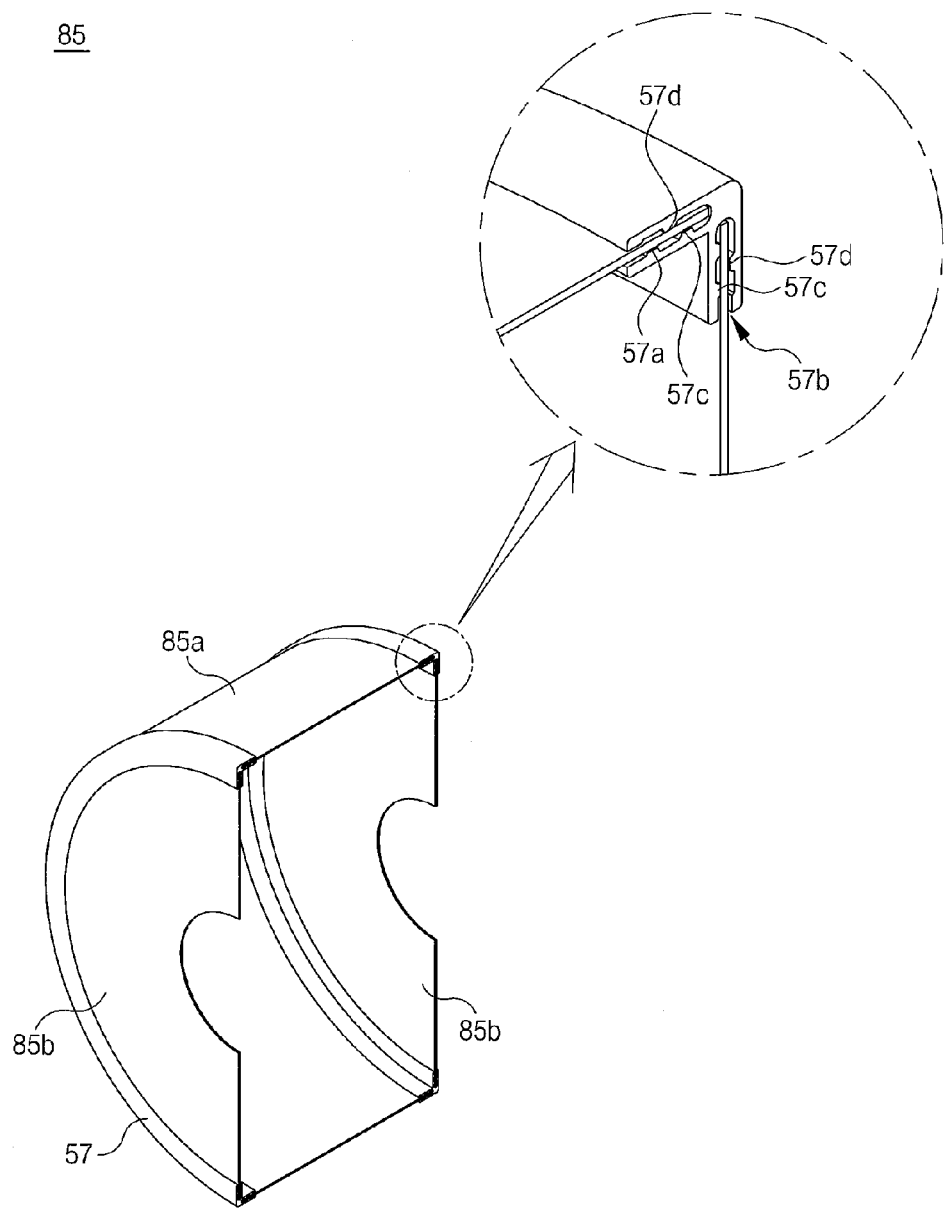
FIG. 11 is a view for explaining the structure and connection (assembly) method of a flange finishing cover.

FIG. 11 is a view for explaining the structure and connection (assembly) method of the flange finishing cover 85.

As shown in FIG. 11, a plurality of plates 85a and 85b and at least one joint chassis 57 are assembled so as to correspond to the curved surface of the segment 14a or 14b, whereby the finishing cover 85 is assembled, and is used as an external cover for the segment 14a or 14b constituting the flange finishing cover 85.

The flange finishing cover 85 has a structure in which at least one joint chassis 57 and the plurality of plates 85a and 85b are connected. Although not shown, additionally, the end portions of the flange finishing cover 85 may be connected with at least one finishing chassis 58 in the same way as that of the elbow finishing cover 55.

The at least one joint chassis 57, the plurality of plates 85a and 85b, and the at least one finishing chassis 58 constituting the flange finishing cover 85 may contain a soft metal material (for example, an aluminum material).

The at least one joint chassis 57 constituting the flange finishing cover 85 has the same as that of the second joint chassis 57 described with reference to FIG. 9 in the structure and the connection manner, but may form a curve in the opposite direction to that of the second joint chassis.

The at least one joint chassis 57 may be bent at the middle portion such that the first end portion and the second end portion form a predetermined angle and its cross-sectional shape becomes an L shape. That is, the at least one joint chassis may be configured by bending the middle portion of the first joint chassis 56 at a right angle or a predetermined angle.

Therefore, at a first assembly end portion of the at least one joint chassis 57, a first insertion groove 57a is formed long in the longitudinal direction, and at a second assembly end portion on the opposite side, a second insertion groove 57b is formed along the longitudinal direction. On one internal side surface of each of the first insertion groove 57a and the second insertion groove 57b, a saw-toothed first protrusion 57c is formed, and on the other internal side surface, a saw-toothed second protrusion 57d is formed alternately with the first protrusion 57c. A plurality of first protrusions 57c and a plurality of second protrusions 57d may be formed.

The first protrusion 57c and the second protrusion 57d are formed so as not to face each other. That is, at a portion of the other inner side portion facing a portion where the first protrusion 57c is formed, the second protrusion 57d is not formed, and at a portion close to the portion of the other inner side portion facing the portion where the first protrusion is formed, the second protrusion 57d is formed so as to be able to be engaged with the first protrusion during compression.

As shown in the cross-sectional view of the upper right part of FIG. 11, the at least one joint chassis 57 may have a cross section of an L shape, and may have a curved shape corresponding to the curved surfaces of the segments 14a and 14b. For reference, the cross-sectional view of the upper right part of FIG. 11 shows a form before the joint chassis 57 and the plates 85a and 85b are compressed.

The at least one joint chassis 57 can be used to connect two plates 85a and 85b at a right angle or a predetermined angle.

The plurality of plates 85a and 85b has lengths corresponding to the lengths of the segment 12a or 12b, and may have a flat plate shape or a curved shape corresponding to the curved surfaces of the flange portions 24, and may have various widths so as to be able to surround the curved surfaces of the flange portions 24.

Specifically, a curved rectangular plate 85a and semicircular plates 85b can be provided and be connected at right angles.

The manner to connect (assemble) the plurality of plates 85a and 85b and the at least one joint chassis 57 is the same as the manner described with respect to the T-joint finishing cover 65.

As described above, according to the present invention, attachment and detachment are easy, and it is possible to improve a degree of connection accuracy, and it is possible to achieve process simplification. Also, it is possible to improve the rigidity of finishing covers and enhance the connection strengths of connection portions.

The above embodiment has been described as an example with reference to the drawings for a more thorough understanding of the present invention, and should not be construed to limit the present invention. Also, it is apparent that those skilled in the art can make various modifications and variations without departing from the basic principle of the present invention.

The invention claimed is:

1. A pipe insulation apparatus which includes elbow insulation units that are applied on the outer surfaces of elbows of pipes, T-joint insulation units that are applied on the outer surfaces of T-joints of the pipes, straight-pipe insulation units that are applied on the outer surfaces of straight pipes of the pipes, and flange insulation units that are applied on the outer surfaces of flange portions of the pipes, wherein:
   each of the elbow insulation units, the T-joint insulation units, the straight-pipe insulation units, and the flange insulation units includes a plurality of segments which is connected so as to be separable along division lines, and each of the plurality of segments is composed of a plurality of insulation layers, and is covered by a finishing cover,
   the finishing cover includes:
      at least one joint chassis that is made of a soft metal material, and has a first insertion groove and a second insertion groove formed at a first end portion and a second end portion, respectively, and has a saw-toothed first protrusion formed on one inner side surface of each of the first insertion groove and the second insertion groove and a saw-toothed second protrusion formed alternately with the first protrusion on the other inner side surface; and
      a plurality of plates that is made of a soft metal material, and
   in a manner in which one end portion of a first plate which is any one of the plurality of plates is inserted into the first insertion groove, and one end portion of a second plate to be adjacent to the first plate is inserted into the second insertion groove, and then at least one joint chassis is compressed such that the first plate and the second plate are connected, the plurality of plates and at least one joint chassis are connected so as to correspond to the curved surfaces of the pipes.

2. The pipe insulation apparatus according to claim 1, wherein:
   the at least one joint chassis has a cross section of an H shape, or is bent at the middle portion such that the first end portion and the second end portion form a predetermined angle.

3. The pipe insulation apparatus according to claim 1, wherein:
   each of the at least one joint chassis and the plurality of plates is made of an aluminum material.

4. The pipe insulation apparatus according to claim 1, wherein:
   the finishing cover further includes at least one finishing chassis, which contains a soft metal material, and has a third insertion groove formed in one end portion and has a U shape, and has saw-toothed first protrusions formed at regular intervals on one inner side surface of the third insertion groove and saw-toothed second protrusions formed alternately with the first protrusions on the other side surface, and in a state where only one end portion of a plate which is one of the plurality of plates and constitutes an end portion of the finishing cover is connected to the at least one joint chassis, and the other end portion is inserted into the third insertion groove, the at least one finishing chassis is compressed such that the plate and the at least one finishing chassis are connected.

5. The pipe insulation apparatus according to claim 1, wherein:

each of the plurality of segments includes an inner insulation layer, an outer insulating layer which is disposed on the outer side in the radial direction of the inner insulation layer, and an intermediate insulation layer which is interposed between the inner insulation layer and the outer insulation layer.

* * * * *